(No Model.)

C. CLAUSS.
VEGETABLE AND FRUIT GRATER.

No. 366,459. Patented July 12, 1887.

WITNESSES:
Th. Rolle
A. P. Grant

INVENTOR:
Charles Clauss
BY John A. Wiederstein
ATTORNEY

United States Patent Office.

CHARLES CLAUSS, OF PHILADELPHIA, PENNSYLVANIA.

VEGETABLE AND FRUIT GRATER.

SPECIFICATION forming part of Letters Patent No. 366,459, dated July 12, 1887.

Application filed March 19, 1887. Serial No. 231,552. (No model.)

*To all whom it may concern:*

Be it known that I, CHARLES CLAUSS, a subject of the King of Saxony, Germany, residing in the city and county of Philadelphia, State of Pennsylvania, have invented a new and useful Improvement in Vegetable and Fruit Graters, which improvement is fully set forth in the following specification and accompanying drawings, in which—

Figure 1:
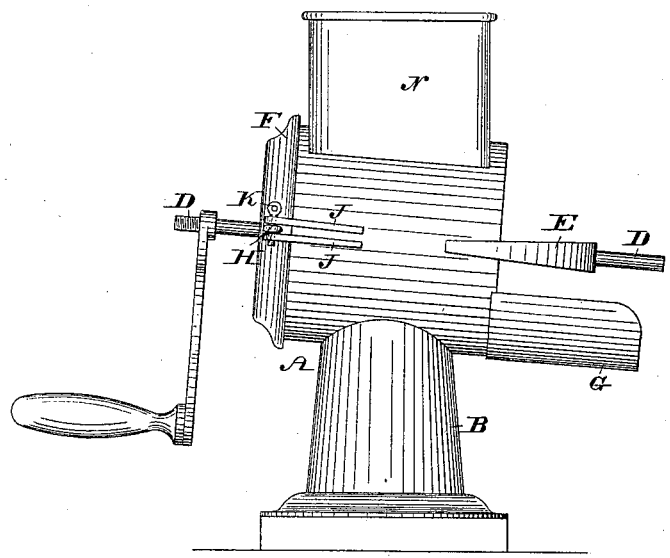
Figure 2:
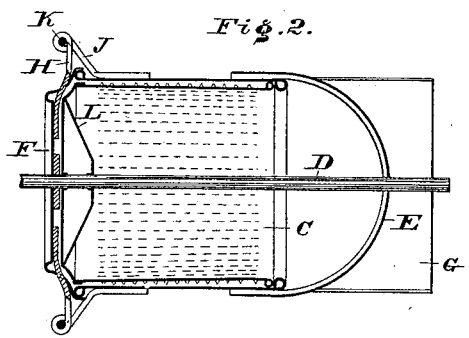
Figures 3, 4, 5:
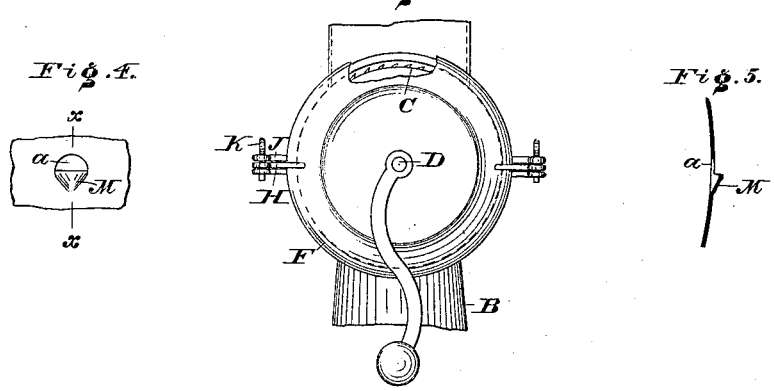

Figure 1 represents a side elevation of a vegetable and fruit grater embodying my invention. Fig. 2 represents a horizontal section thereof. Fig. 3 represents an end view thereof, partly broken away. Fig. 4 represents a detached view of a portion of grating-cylinder on an enlarged scale. Fig. 5 represents a section thereof in line $x$ $x$, Fig. 4.

Similar letters of reference indicate corresponding parts in the several figures.

My invention consists of improvements in a vegetable and fruit grater embodying a grating-cylinder which is effective in operation, novel bearings for the shaft of the cylinder, fastenings for the end cap of the casing, and other features, as will be hereinafter set forth.

Referring to the drawings, A represents a cylindrical casing, which is supported on the stand B and contains the grating-cylinder C, which is hollow and secured to the shaft D, one end of which is mounted on the yoke E and the other end on the cap F, said yoke being secured to the casing A and presenting no material obstruction to the discharge of the grated material from the cylinder C, it being noticed that the adjacent ends of the casing and cylinder are open, the casing having a spout, G, said casing, cylinder, and spout being inclined.

The cap F is provided with eyes H, which enter eyes J, which are secured to the casing A, said eyes H projecting radially from the periphery of the cap, and said eyes J projecting longitudinally rearward from the casing, the eyes J being in pairs on each side, so that one of the eyes H enters between the members of a pair of eyes J. Pins K are passed through the eyes H J, thus connecting the cap F with the casing and holding it securely in position. By removing the pins K the cap may be released and the cylinder C and its shaft D readily withdrawn from the casing A.

The closed end of the cylinder C is of the form of a depressed or conical plate, L, for purposes of strength, the strength being increased by corrugations formed on said plate. The inner surface of the conical plate L also serves as a breaker or agitator for any material that may be directed by centrifugal action to the upper end of the cylinder, and throws the same toward the open end of the cylinder.

The grating-teeth M of the cylinder C are struck up from the metal of which the cylinder is constructed, and stand out therefrom in semi-conical or scoop-shaped form. The cutting-edge of each tooth is broad and thus effective in action on the material to be grated, said material being placed within the hopper N and resting on the cylinder, which is rotated by a crank-shaft or other suitable device.

In front of each tooth is an opening, forming a throat, $a$, which permits the grated material to enter the cylinder, from whence it is discharged at the open end thereof.

Having thus described my invention, what I claim as new, and desire to secure by Letters Patent, is—

1. A grater consisting of the stand B, the inclined casing A, with spout G, the cylindrical grater C, with inner closed end, the yoke E, and removable cap F, forming bearings for the journal of said cylindrical grater, said parts being combined substantially as and for the purpose set forth.

2. A grater consisting of the casing A, with eyes J J on opposite sides thereof, the cylindrical grater C, with inner conical closed end, the shaft D, the yoke E, the removable cap F, having radial eyes H, and the pins K, substantially as described.

3. A grater-casing with a yoke at one end thereof, in combination with a removable cap, a shaft having a bearing in said yoke and cap, and a cylindrical grater having an inner closed end, substantially as described.

CHARLES CLAUSS.

Witnesses:
JOHN A. WIEDERSHEIM,
JAS. F. KELLY.